United States Patent
Nevermann

(10) Patent No.: US 6,980,157 B2
(45) Date of Patent: Dec. 27, 2005

(54) COMMUNICATIONS TERMINAL

(75) Inventor: Peter Nevermann, San Diego, CA (US)

(73) Assignee: Siemens Aktiengesellschaft, Munich (DE)

( * ) Notice: Subject to any disclaimer, the term of this patent is extended or adjusted under 35 U.S.C. 154(b) by 265 days.

(21) Appl. No.: 10/415,230

(22) PCT Filed: Sep. 19, 2001

(86) PCT No.: PCT/DE01/03615

§ 371 (c)(1),
(2), (4) Date: Apr. 25, 2003

(87) PCT Pub. No.: WO02/35810

PCT Pub. Date: May 2, 2002

(65) Prior Publication Data

US 2004/0036656 A1 Feb. 26, 2004

(30) Foreign Application Priority Data

Oct. 25, 2000 (DE) .................................. 100 52 909

(51) Int. Cl.⁷ .............................................. H01Q 9/04
(52) U.S. Cl. ..................................................... 343/702
(58) Field of Search ............................... 343/702, 700, 343/767, 700 MS

(56) References Cited

U.S. PATENT DOCUMENTS

| | | | |
|---|---|---|---|
| 5,883,966 A * | 3/1999 | Kubo | 381/386 |
| 5,929,813 A * | 7/1999 | Eggleston | 343/700 MS |
| 5,952,975 A * | 9/1999 | Pedersen et al. | 343/702 |
| 6,008,762 A * | 12/1999 | Nghiem | 343/700 MS |
| 6,147,649 A * | 11/2000 | Ivrissimtzis et al. | 343/700 MS |
| 6,184,833 B1 * | 2/2001 | Tran | 343/700 MS |
| 6,204,819 B1 * | 3/2001 | Hayes et al. | 343/702 |
| 6,246,374 B1 * | 6/2001 | Perrotta et al. | 343/702 |
| 6,271,794 B1 * | 8/2001 | Geeraert | 343/700 MS |
| 6,366,243 B1 * | 4/2002 | Isohatala et al. | 343/700 MS |
| 6,421,016 B1 * | 7/2002 | Phillips et al. | 343/702 |

FOREIGN PATENT DOCUMENTS

| | | |
|---|---|---|
| EP | 0 924 793 | 6/1999 |
| EP | 1 184 936 | 3/2002 |
| FR | 2 783 652 | 3/2000 |
| WO | WO 00/38475 | * 6/2000 |

* cited by examiner

Primary Examiner—Thuy V. Tran
Assistant Examiner—Hung Tran Vy
(74) Attorney, Agent, or Firm—Bell, Boyd & Lloyd LLC

(57) ABSTRACT

A communications terminal is provided which includes an antenna element, which has a specific antenna volume, and an acoustic output device, wherein the antenna element and the acoustic output device are designed and/or arranged with respect to each other such that at least part of the antenna volume forms at least part of a resonant cavity for the acoustic output device.

10 Claims, 2 Drawing Sheets

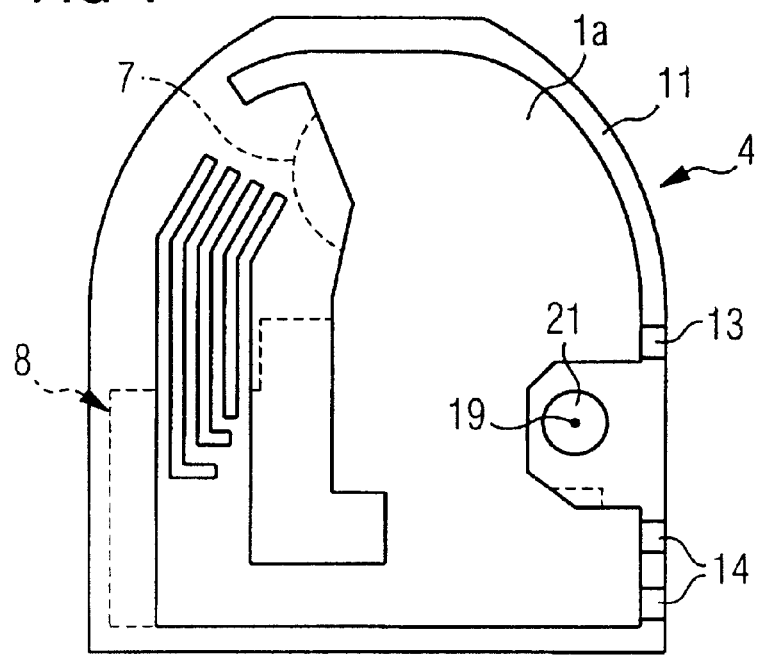
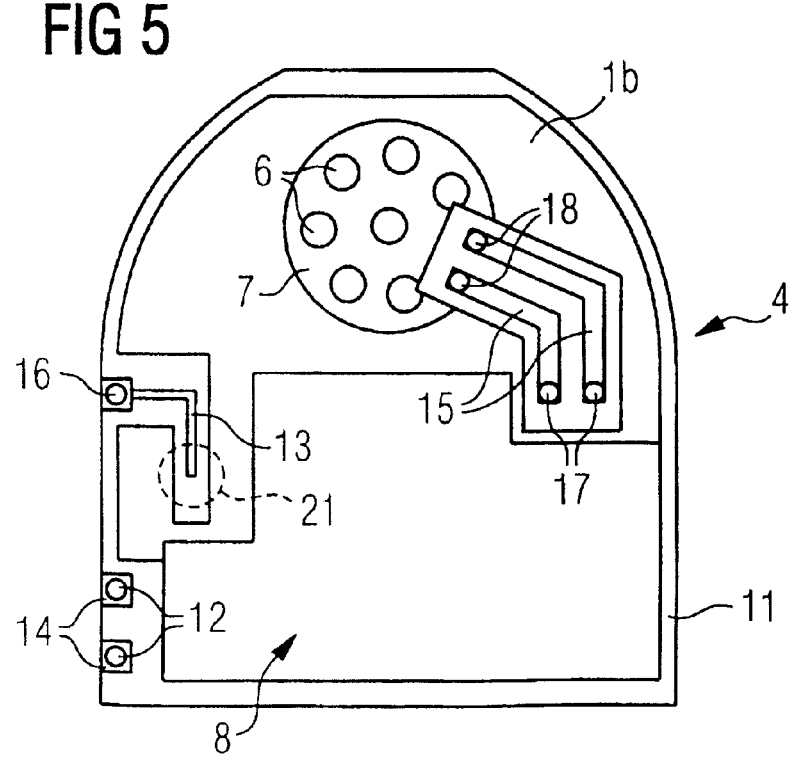

COMMUNICATIONS TERMINAL

This application is a 371 of PCT/D E01/03615 Sep. 19, 2001.

BACKGROUND OF THE INVENTION

The present invention relates to a communications terminal having an antenna element, which has a specific antenna volume, and an acoustic output device.

In the development of modern communications terminals, particularly mobile handheld devices such as mobile phones, palmtops or PDAs (Personal Digital Assistants) having appropriate mobile radio functions, minimizing the overall dimensions of the device is increasingly important. At the same time, the device is meant to offer ever more facilities with ever better quality, including optimizing the reproduction quality of the transmitted signals. Apart from improving the microphone of the transmitting communications terminal, this also requires the best possible transmission quality of the signal over the air interface, and a qualitatively good acoustic output device in the receiving device.

Crucial for the transmission quality of the signals over the radio network are the antenna elements used by the device. In order to radiate and receive electromagnetic radiation in a specified frequency band, such an antenna element defines and requires a certain space, known as the "antenna volume", which must be kept as clear as possible of obstructions to avoid effects on the antenna characteristics. Since the antenna elements in more modern devices are preferably integrated in the device, the communications terminal takes up a larger amount of space. In addition, the requirement for communications terminals with dual-band capability or multi-band capabilities means that the antennas need to occupy even more space. Thus for given outer dimensions of the overall device, improvements in other components, which are again associated with an increased space requirement of the components concerned, are generally only possible by, for example, reducing the space for the antenna while accepting a degradation in the antenna properties.

An object of the present invention, therefore, is to create an alternative mobile phone to the state of the art, which with minimum possible dimensions provides a good antenna transmission quality while also providing a good acoustic output quality of the received signals.

SUMMARY OF THE INVENTION

According to the present invention, the antenna element and the acoustic output device of the communications terminal are designed and/or arranged with respect to each other in such a way that at least part of the antenna volume forms at least part of a resonant cavity for the acoustic output device; for example, an earpiece. As a result of the present invention, the space available in the communications terminal is utilized very effectively in that the space required for the antenna function is simultaneously optimized and designed as a resonant cavity. As such, the space inside the communications terminal is used for two different functions without impairments to the one function arising from the use for the other function. For the antenna function, an air-filled interior cavity area is optimum, because such an air-filled area only has a small dielectric constant and does not cause any RF losses at all. The acoustics also need as large an air-filled area as possible as resonant cavity for optimum operation; for example, as a "back-cavity" volume at the back of an earpiece.

Preferably, the antenna element is disposed on an antenna support containing a cavity having an opening on which the acoustic output device is arranged in such a way that the cavity forms the resonant cavity for the acoustic output device. Obviously, the opening may also take the form of a number of small holes, a mesh or the like. The cavity should be substantially soundproof, except for the opening or openings placed on the acoustic output device, so that the required sound pressure can be established at the opening(s) on the acoustic output device.

Such a construction can be achieved, for example, by the antenna support consisting of a body made of non-conducting, (i.e., insulating), material containing a cavity having the relevant opening. This cavity then forms the resonant cavity. Since the body is made of non-conducting material, it can lie within the antenna volume. This means that, for example, the antenna element can be applied outside on the body. Preferably, this takes the form of one or more conducting areas each applied to a surface of the antenna support.

In a particularly advantageous exemplary embodiment, the antenna support also contains a mounting for the acoustic output device. This can be implemented, for example, by a recess made in the antenna support into which the earpiece is inserted and secured.

In a further preferred exemplary embodiment, the antenna support also contains one or more integral screened cavities for screening specific areas within the communications terminal; for example, areas on a circuit board that are susceptible to EMC from the RF radiation emitted from the antenna. These screened cavities can be formed by recesses made in the surface of the body forming the antenna support and coated internally with a conducting layer, where the antenna support must be positioned at the appropriate position on the circuit board so that the recess covers the area to be screened on the circuit board.

For maximum efficiency when fitting such an antenna support having the antenna element and the acoustic output device, the antenna support preferably also contains contact elements for making conductive contact with the antenna element and/or the acoustic output device and/or the screened cavity. The antenna support having the applied antenna elements, the pre-fitted acoustic output device (or, specifically, earpiece), and the finished screened cavity with the associated contact elements, can simply be placed as a prefabricated module at the required position on the circuit board during final assembly of the communications terminal. By designing the contact elements to the circuit board to be elastic so as to create pressure contacts, other additional work operations such as contact soldering can be avoided.

Additional features and advantages of the present invention are described in, and will be apparent from, the following Detailed Description of the Invention and the Figures.

BRIEF DESCRIPTION OF THE FIGURES

FIG. 4 shows a plan view from above the antenna module of FIG. 1.

FIG. 5 shows a plan view from below the antenna module of FIG. 1.

DETAILED DESCRIPTION OF THE INVENTION

Figure 1:
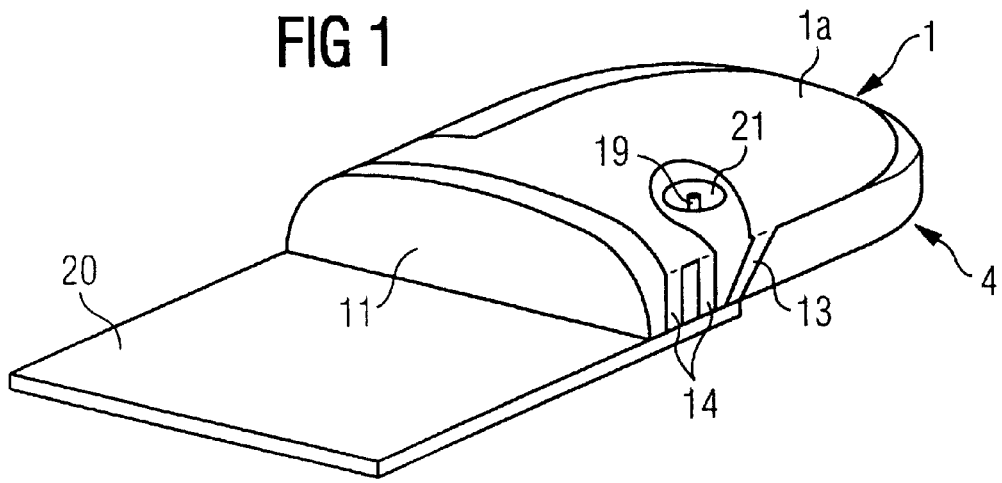
FIG. 1 shows a perspective view of an antenna module that basically includes an antenna support with an applied antenna element for fitting in a communications terminal according to the present invention.

The figures show an antenna module for a communications terminal according to the present invention; specifically, a mobile phone. This module has an antenna support 4 which is basically formed as a non-conducting plastic body 11. This antenna support 4 is coated on two opposite surfaces with specially patterned conducting areas 1a, 1b forming a two-piece antenna element 1. The antenna volume extends between the conducting areas 1a, 1b. This antenna module is placed in suitable contact with a printed circuit board 20 of the mobile phone at the intended position in the mobile phone.

The design and shape of the antenna module are described in detail below.

The plastic body 11 forming the antenna support 4 consists of two joined half-shells, which thereby create a cavity 5 inside the plastic body 11. For good sound quality, the resonant cavity 3 should have a maximum volume. The cavity 5 is therefore chosen to be as large as possible, while taking care that the remaining wall thickness of the plastic body 11 guarantees sufficient rigidity. With regard to the outer shape, the plastic body 11 is designed to fit the case shape, or rather the space available in the mobile phone, and the required three-dimensional shape of the antenna element 1 or the antenna volume 2.

Accordingly, the plastic body 11 has a substantially flat side, which is also referred to below as the front face. There is a recess 7 in the front face, into which an earpiece (not shown) is inserted at assembly. There are a number of holes 6 between the recess 7 for the earpiece and the cavity 5, so that the cavity 5 forms a resonant cavity 3, more precisely a back-cavity volume, for the suitably designed earpiece introduced into the recess 7.

Beside the recess 7 on the front face of the plastic body 11, there is another recess which forms a screened cavity 8 integrated in the antenna support 4. Components of the mobile phone that are susceptible to RF interference and requiring particular protection, such as a display controller, can be housed inside this screened cavity 8. Components that need to be screened owing to their tendency to create interference, for instance an output stage of the transmit device which emits unwanted harmonics, also can be housed in the screened cavity.

On the rear face opposite the front face, the body 11 is shaped to fit the shape of the mobile phone case. In the present exemplary embodiment this is a module for a mobile phone having a case with a rounded back and top. The rear face, consequently, also is shaped with a matching convex curve.

The antenna element 1 itself consists of two conducting areas applied to the front face and back face 1a, 1b. These surfaces have the pattern required for the antenna function. The precise shape, or rather pattern, of the antenna is here arbitrary for the present invention and depends on the frequency bands in which the antenna is meant to work. In the present exemplary embodiment, the antenna is a "PIF" (Planar Inverted F) antenna. On the front face of the body 11, the conducting area 1b of the antenna element also runs continuously on the interior sides 10 of the recesses 7, 9 for the earpiece and screened cavity 8. As such, the this conducting area 1b acts as part of the antenna element 1, while also forming the screening for the earpiece and the screened cavity 8.

Figure 2:
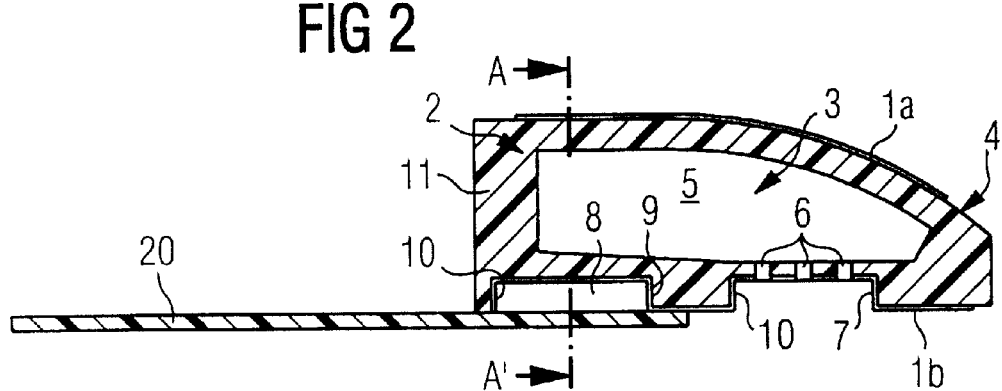
FIG. 2 shows a central longitudinal section through the antenna module of FIG. 1.
Figure 3:
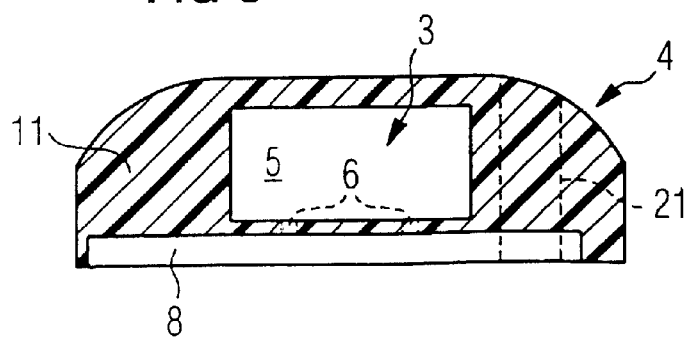
FIG. 3 shows a cross-section through the antenna support of the antenna module in FIG. 2 along the intersection line A–A'.

The whole module is then placed, as shown in FIG. 2, with part of the front face on the circuit board 20 of the mobile phone, so that the screened cavity 8 is located directly over the circuit board 20, and the recess 7 for the earpiece lies beyond the top end of the circuit board 20 within the case of the mobile phone. On the circuit board 20 are contact surfaces, which make contact with the front-face conducting area 1b of the antenna element 1 when the module is placed on the circuit board 20. This front-face conducting area 1b of the antenna element 1 is thus taken to the ground potential of the mobile phone.

Preferably, elastic contacts are disposed on the conducting area 1b that ensure reliable pressure contact with the contact surfaces on the circuit board 20. The exemplary embodiment shown has multiple contact points along the periphery of the screened cavity 8 which are positioned relatively closely to each other so as to ensure that the cavity 8 is screened against RF interference. Metal springs, for example, or even drops of conductive silicon applied as spot-shaped contacts, may be used to form the elastic contact points. Of course, instead of the spot-shaped contacts along the periphery of the screened cavity, a continuous string of conductive silicon or the like also can be applied.

In the exemplary embodiment shown, the pattern of the conducting area 1b on the front face of the module is chosen so that conducting patterns 15 having appropriate contact points 17, 18 are also integrated in the module for making contact with the earpiece. These patterns 15 also may be elastic metal springs or printed patterns provided with, for example, an elastic conductive silicon or the like at each of the contact points 17, 18.

During operation, the RF signal is applied to the conducting area 1a of the antenna element 1 applied to the rear face of the plastic body 11. This is done via at least one, preferably multiple contact strips 13, 14 (three in the present case), which stretch from the rear face of the plastic body 11 around one edge to the front face of the plastic body 11, and are there provided with elastic contact points 12, 16, which in the assembled state press onto corresponding contact elements on the circuit board 20.

In the plastic body 11, there is also a through hole 21 passing from the rear face to the front face to accommodate a coaxial connector for connecting an external antenna. This hole 21 runs beside the cavity 5 and the screened cavity 8, i.e., it has no effect on the resonant cavity 3 nor the screened cavity 8. The antenna support 4 thus additionally provides a rigid support for the coaxial connector of an external antenna; for example, the antenna of a vehicle hands-free device. The inner conductor 19 of this coaxial connector is connected via a contact strip 13 and corresponding contact point 16 to the conducting area 1a on the rear face of the plastic body 11 and to the circuit board 20, so that the RF signal is also present here. The outer conductor (i.e., the RF connector screening), is correspondingly connected to the ground potential (i.e., the conducting area 1b on the front face of the plastic body 11).

The introduction of the patterns 13, 14, 15 for the contacts, the hole 21 for the coaxial connector and the openings 6 into the conducting area 1a, 1b normally does not impair the antenna function, since these patterns 13, 14, 15, hole 21 and openings 6 are either relatively small in relation to the overall surface area, or can be taken into account when designing the antenna structure.

The present invention provides optimum utilization of the space available in the mobile phone. The necessary antenna volume 2 is advantageously used for improving the acoustics. In addition, the antenna support provides a screening function for specific areas on a circuit board 20 of the mobile phone, plus a retaining function for an earpiece or a loudspeaker. Hence, a separate mounting for the earpiece is not required, wherein the cost may be reduced. Furthermore, it ensures that contact is made reliably and simply with the antenna, the screening and the earpiece. Using the rigid plastic body 11 for the antenna support 4, onto which the antenna element 1 is applied as conducting areas 1a, 1b, also avoids tolerance problems that arise in an antenna construction without extra support. The whole finished module is thus relatively easy and economic to manufacture, and can be fitted quickly and without great effort during assembly of the mobile phone.

Although the present invention has been described with reference to specific embodiments, those of skill in the art will recognize that changes may be made thereto without departing from the spirit and scope of the present invention as set forth in the hereafter appended claims.

What is claimed is:

1. A communications terminal, comprising:
    an antenna element having an antenna volume;
    an antenna support comprising contact elements, a cavity with an opening, and a mounting, wherein the antenna element is arranged on the antenna support; and
    an acoustic output device arranged on said mounting, wherein the antenna elements and the acoustic output device are particularly arranged such that at least part of the antenna volume forms at least part of a resonant cavity for the acoustic output device, and wherein the acoustic output device is operatively coupled to the contact elements.

2. A communications terminal as claimed in claim 1, wherein the acoustic output device is particularly arranged such that the cavity forms the resonant cavity for the acoustic output device.

3. A communications terminal as claimed in claim 2, wherein the antenna support includes a body made of non-conducting material having at least one of a recess and at least one cavity.

4. A communications terminal as claimed in claim 2, wherein the antenna support includes two half-shells.

5. A communications terminal as claimed in claim 2, wherein the antenna element further includes at least one conducting area applied to a surface of the antenna support.

6. A communications terminal as claimed in claim 2, wherein the antenna support includes a recess on an outer side in front of the opening of the cavity for receiving an ear piece.

7. A communications terminal as claimed in claim 1, wherein the antenna support includes a screened cavity.

8. A communications terminal as claimed in claim 7, wherein the contact elements are further operatively coupled to at least one of the antenna element and the screened cavity.

9. A communications terminal as claimed in claim 7, wherein the screened cavity is formed by a recess in the antenna support coded internally with a conducting layer.

10. A communications terminal as claimed in claim 1, wherein the communications terminal is a mobile phone.

* * * * *